United States Patent [19]
Malik

[11] Patent Number: 6,104,505
[45] Date of Patent: Aug. 15, 2000

[54] METHOD AND APPARATUS FOR ROUTING DATA INFORMATION CONVEYED IN A FACSIMILE MESSAGE

[75] Inventor: Naeem Iqbal Malik, Fremont, Calif.

[73] Assignees: Ricoh Company, Ltd., Tokyo, Japan; Ricoh Corporation, San Jose, Calif.

[21] Appl. No.: 08/841,655

[22] Filed: Apr. 30, 1997

[51] Int. Cl.⁷ ........................................................ H04N 1/00
[52] U.S. Cl. ........................... 358/434; 358/405; 358/400
[58] Field of Search ...................... 379/100.17; 358/434, 358/400, 435, 436, 442, 468

[56] References Cited

U.S. PATENT DOCUMENTS

| | | | |
|---|---|---|---|
| 5,206,743 | 4/1993 | Hochman | 358/440 |
| 5,291,546 | 3/1994 | Giler et al. | 379/100 |
| 5,495,581 | 2/1996 | Tsai | 395/154 |
| 5,790,641 | 8/1998 | Chan | 379/100.17 |
| 5,841,843 | 11/1998 | Bristow | 379/100.09 |
| 5,886,793 | 3/1999 | Satou | 358/404 |
| 5,914,955 | 6/1999 | Rostoker et al. | 370/395 |

OTHER PUBLICATIONS

Nest Autoroute Code Definition, NOVELL NetWare Network Computing Products, Apr., 1995.
Will Fax–Routing Standard Deliver?, by Patrick Dryden, Oct. 10, 1994, pp. 27 & pp. 30.
The Facts About FireWire, By Ingrid J. Wickelgren, IEEE Spectrum, Apr. 199, pp. 19–25.

*Primary Examiner*—Jerome Grant, II
*Attorney, Agent, or Firm*—Oblon, Spivak, McClelland, Maier & Neustadt, P.C.

[57] ABSTRACT

A method and apparatus that provides any type of data information in a facsimile message is configured to accept data information at a source terminal from an external device and send the data information to one or more destination terminals via a facsimile message. In particular, a processor formats the data information in the form of one or more non-standard frames that are conventionally used only to support point to point polling operations for two facsimile devices. The data information is accepted from an external data source and converted by the processor to the one or more NSF frames. A routing feature of the present invention allows the facsimile message containing the data information to one or more destination terminal which are user-selectable at the source terminal.

14 Claims, 11 Drawing Sheets

METHOD AND APPARATUS FOR ROUTING DATA INFORMATION CONVEYED IN A FACSIMILE MESSAGE

CROSS-REFERENCES TO RELATED APPLICATIONS

This application contains subject matter related to that disclosed in commonly owned, co-pending applications 08/655,079 filed on Jun. 5, 1996 entitled "A METHOD AND SYSTEM FOR FORMING A MESSAGE INCLUDING A SUBADDRESS" now U.S. Pat. No. 5,991,290, and 08/778,779 filed on Jan. 6, 1997 entitled "A METHOD AND SYSTEM FOR ROUTING A MESSAGE TO MULTIPLE MACHINES", both of which are incorporated herein by reference.

BACKGROUND OF THE INVENTION

1. Field of the Invention

The present invention pertains to communication systems and methods for routing any type of information from a source facsimile terminal capable over a communications link and through a network destination server to one or more destination terminals. In particular, the present invention pertains to gathering and sending data information from a source terminal using a non-standard signaling format with extended non-standard frames to a network destination server for distribution to one or more destination terminals connected to the network destination server.

2. Discussion of the Background

Although facsimile machines have found a niche in the evolving field of computer and Radio Frequency (RF) communication networks, problems exist in "integrating" these paper-based legacy systems into modern communications networks. While advances have been made in the facsimile technology community that permit facsimiles to route messages within local networks to particular destination terminals, each known option is cumbersome in that each option requires an operator to send a facsimile multiple times if copies of the facsimile are to be received at more than one destination terminal.

Conventional facsimile machines are configured to operate as "point-to-point" communications devices and serve to send only information that is scanned into a source facsimile. As such, a single document scanned into and sent from the source facsimile to multiple destination facsimile machines occur as multiple discrete events, where each event requires separate use of a public switched telephone network (PSTN) telephone line.

Limitations with the above-described traditional approach are that it requires users at the destination and source terminals to manually interact with their respective facsimile machines, and requires a dedicated telephone line to service the destination facsimile machine. The present inventor has determined that a need exists for facsimile machines to communicate to other terminals using the shared resources of a network, and to have a "user-friendly" user interface that makes it easy for a user to send a message that includes any type of information to one or more destination terminals. Furthermore, the present inventor has determined that a need exists for a general purpose communications resource that can send facsimile data as well as any type of data information that is input from an external data source.

The International Telecommunications Union (ITU) developed the CCITT/ITU-T recommendation T.30, "The Blue Book", Ver. 7, Vol. VII (hereinafter "CCITT T.30"), the contents of which are incorporated herein by reference, as an approach for allowing two facsimile devices to communicate facsimile data to one another using a "non-standard" message protocol. In one instance, if the two facsimile are not compatible non-standard facilities, a message protocol is established where the two terminals "train" one another regarding the formats of messages that will be transmitted between themselves as part of a handshaking process. In another instance, where the two terminals are compatible, the two terminals may immediately begin to exchange facsimile information via a non-standard frame (NSF) format. After the training session ends the two facsimile devices send facsimile data to one another.

As recognized by the present inventor, the CCITT T.30 merely defines a message protocol for initialized communications between two facsimile devices for use in facsimile pulling operations. After recognizing that many electronic devices are not adapted to communicate data remotely, the present inventor has recognized that conventional facsimile devices can be adapted to serve as general purpose communications resources that are uniquely adapted to route any type of data information to other similarly configured devices via non-standard frames in facsimile messages.

SUMMARY OF THE INVENTION

Accordingly, one object of this invention is to provide a novel method and apparatus for routing any type of data information in a facsimile message that overcomes the above-mentioned limitations of existing methods and systems.

It is a further object of the invention to provide a method and system for routing any type of information in a non-standard frame (NSF) format conventionally used for conveying facsimile polling information between two non-standard facsimile devices.

It is another object of the present invention to provide an apparatus for accepting data from an external data device and including the data in one or more NSF frames for transmission to a destination terminal as part of a facsimile message.

It is another object of the present invention to provide a method and system for accepting at a source terminal, non-facsimile information (e.g., digitized audio information) from a device which does not include a modem capability and transmit the non-facsimile information in one or more non-standard frames to one or more destination terminals.

These and other objects are achieved with the inventive apparatus and method that form a digital facsimile message that includes one or more NSFs configured to hold any type of information that is generated either internal to the source terminal or external to the source terminal. The digital facsimile message is transmitted to at least one destination terminal where the destination terminal extracts the information from the one or more NSFs. This extracted information is then reformatted, if necessary, and either stored for later retrieval, or routed to the destination terminal(s) identified by the source terminal.

As described in co-pending applications 08/655,079 and 08/778,779, in a step-by-step fashion, the source terminal prompts the user to enter routing information about whether the user intends to route a message to one or more destination terminals, the telephone number (i.e., the "fax number") of the destination server, and the respective identifiers of the destination terminals. The source terminal takes the routing information input by the user in response to each prompting inquiry and forms a facsimile message having a terminal station identifier (TSI) field, consistent with CCITT Group III facsimile standard, where the TSI field includes the routing information.

Subsequently, the source terminal forms a body portion of the facsimile message that conforms to the CCITT-FASSM VII-T.30 standard (see, e.g., page 290), the contents of this standard being incorporated herein by reference. In this body portion of the facsimile message, the data information is hosted in respective data structure fields (about 20 bytes in length) in respective non-standard frames. The source terminal then sends the TSI field including identifiers input by the user to the destination server, where the destination server extracts the identifiers, and converts the identifiers to corresponding network and/or Internet Protocol (IP) addresses of the corresponding identified destination terminals. In the meantime, the source terminal inserts the data information into one or more non-standard frames for transmission to the destination server in the same facsimile message.

The destination server extracts the data information and saves the same in a data file. The destination server then sends the data in the saved data file to identified destination terminals, which may include devices that are not equipped to handle facsimile messages (e.g., a compact disc player).

The inventive system and method also is configured to form a polling message used to retrieve a file or facsimile message from one or more destination terminals or the destination server. One such polling message is a request message (which may be formatted as a facsimile message or an Internet message). The request message is directed to the destination server that requests receipt of an ordered list of the destination terminals serviced by the destination server. The destination server responds to the request message by providing a response message, which employs the NSF frame, that includes the ordered list. After receiving the ordered list, the source terminal can print or display the ordered list entries and prompt the user to select from among the list entries. Based on the selected entries, the source terminal automatically forms a facsimile message that identifies the selected entries by their corresponding position in the ordered list. Consequently, numerous destination terminals may be conveniently selected to receive a copy of the facsimile message that includes any type of data information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
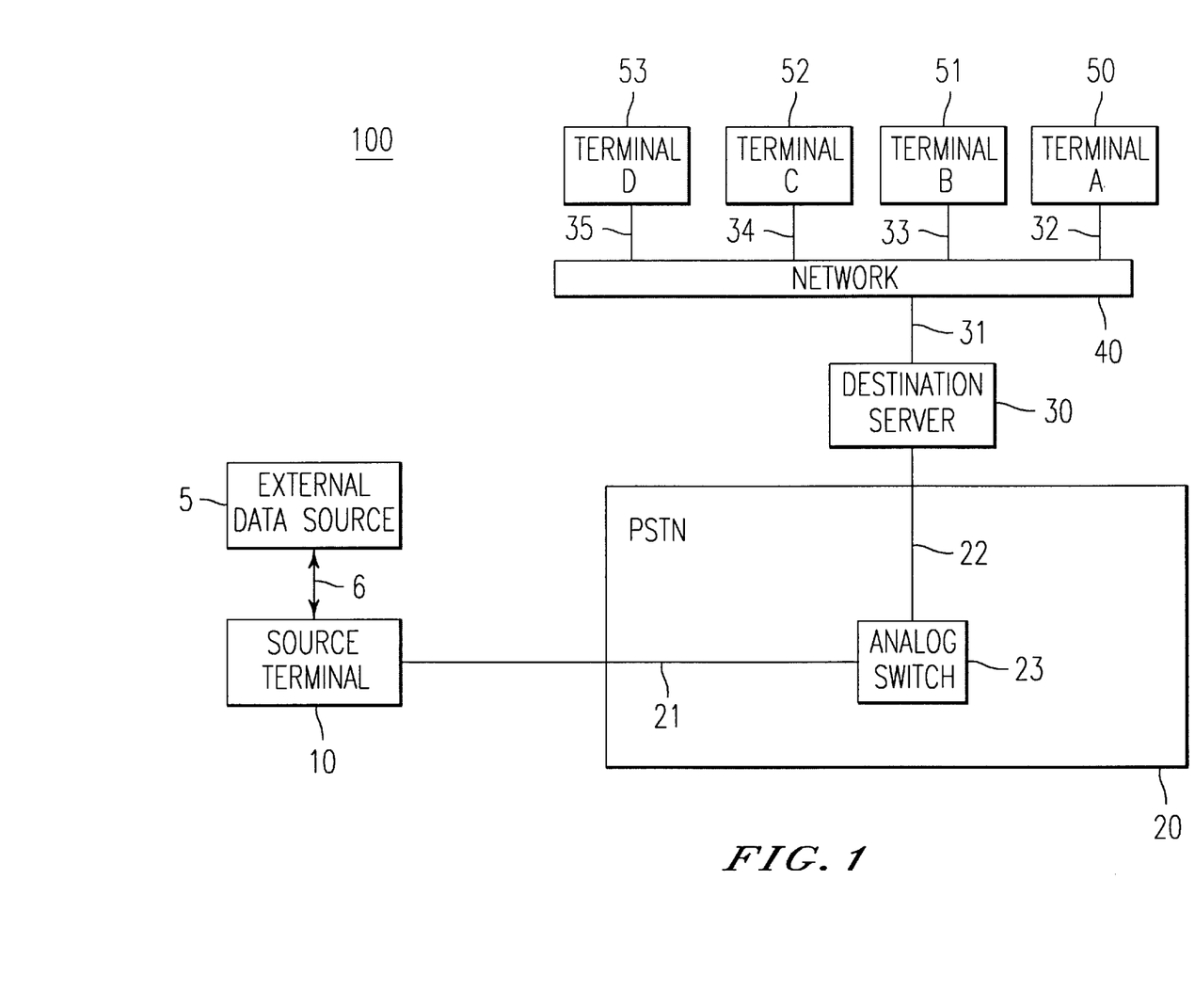
FIG. 1 is a schematic diagram showing a communications system with a network routing architecture according to a first and second embodiment of the present invention.

Referring now to the drawings, wherein like reference numerals designate identical or corresponding parts throughout the several views, and more particularly to FIG. 1 thereof, there is illustrated a digital communication system 100. The digital communications system 100 includes a source terminal 10 such as a Ricoh Corp. facsimile model FAX2700 and a destination terminal 50, such as an AST Bravo LC 4/66d personal computer, each appropriately adapted as discussed herein, where the system 100 permits routing of a digital facsimile message sent from the source terminal 10 to multiple destination terminals 50–53. The source terminal 10 is a facsimile machine although a scanner/computer combination, or simply a computer holding a data file and having a modem therein and appropriate software are example alternatives.

The source terminal 10 is connected via an analog line 21 to a public switch telephone network (PSTN) 20, which includes the analog line 21, an analog switch 23, and a second analog line 22. The destination server 30, includes a '486 workstation (for example) using NetWare® version 4.1 network administration software (for example), as described in NEST Autoroute Code Definition, ®1995 Novell Inc., part number 106-000644-001, and connects to the PSTN 20 through the second analog line 22. At a destination site, the destination server 30 connects via node 31 to the data communication network 40 (preferably a local area network (LAN), but a wide area network (WAN) is an example alternative). The network 40 includes a Novell, Inc. Ethernet backbone (e.g., as defined by Institute of Electrical and Electronics Engineers, IEEE, Standard 802.3), although other networks could be used including other Ethernet variants, Fiber Distributed Data Interface (FDDI) networks, wireless networks, Internet, and proprietary networks. The network 40 and the NetWare® software used on the destination server 30 support the CCITT Group 3 T.30 fax protocol with subaddressing, and the CCITT FASSM VII.2 T.30 non-standard signaling format is also supported. The network 40 respectively connects, via a set of network nodes 32, 33, 34 and 35, to the terminal A 50, the terminal B 51, the terminal C 52 and the terminal D 53 (e.g., computers, printers, other facsimile machines, routers, switches, access points to other networks, ATM devices, etc.).

FIG. 1 also shows an external data source 5 which connects to the source terminal 10 via an external interface 6. The external data source 5 provides digital data or analog data (which is then digitized by the source terminal 10 with an analog to digital converter contained therein) to the source terminal 10 for inclusion in one or more NSFs to be sent from the source terminal 10 to the destination server 30. The external data source may be any type of data source that would benefit from transferring data to a remote location. Examples of external data sources 5 include a printer, digital camcorder, digital camera, digital versatile disc (DVD), digital video cassette recorder, CD player, a digital telephone, computer and a photocopier.

The external interface 6 is a digital bus (serial or parallel) when the source terminal 10 receives digital data through a respective connector(s) formed therein. In particular, example external interfaces 6 include universal serial bus (USB), EIA-232, ISDN (ISO 8877), or IEEE 1394 ("FireWire") as described in Wickelgren, I., "The Facts About "FireWire", IEEE Spectrum, April 1997, Vol. 34, Number 4, pp. 19–25, the contents of which are incorporated herein by reference. When receiving analog data, the external interface 6 is configured as a coaxial cable, a twisted pair, or an optical fiber (for example) and the source terminal 10 includes a respective connector for receiving the analog signals.

Because the source terminal 10 is configured to receive information from the external data source 5 via the external interface 6, the source terminal 10 provides a conventional facsimile function and a significantly different function than conventional facsimile devices. In particular, the source terminal 10 of FIG. 1 also serves as a general purpose communications resource that is capable of transmitting data from various types of external data sources 5 to remote terminals. In a reciprocal manner, the source terminal 10 is equipped to receive data from another terminal (e.g., Terminal A, 50) and provide the data to the external data source 5 for display thereon or for use therein.

Figure 2:
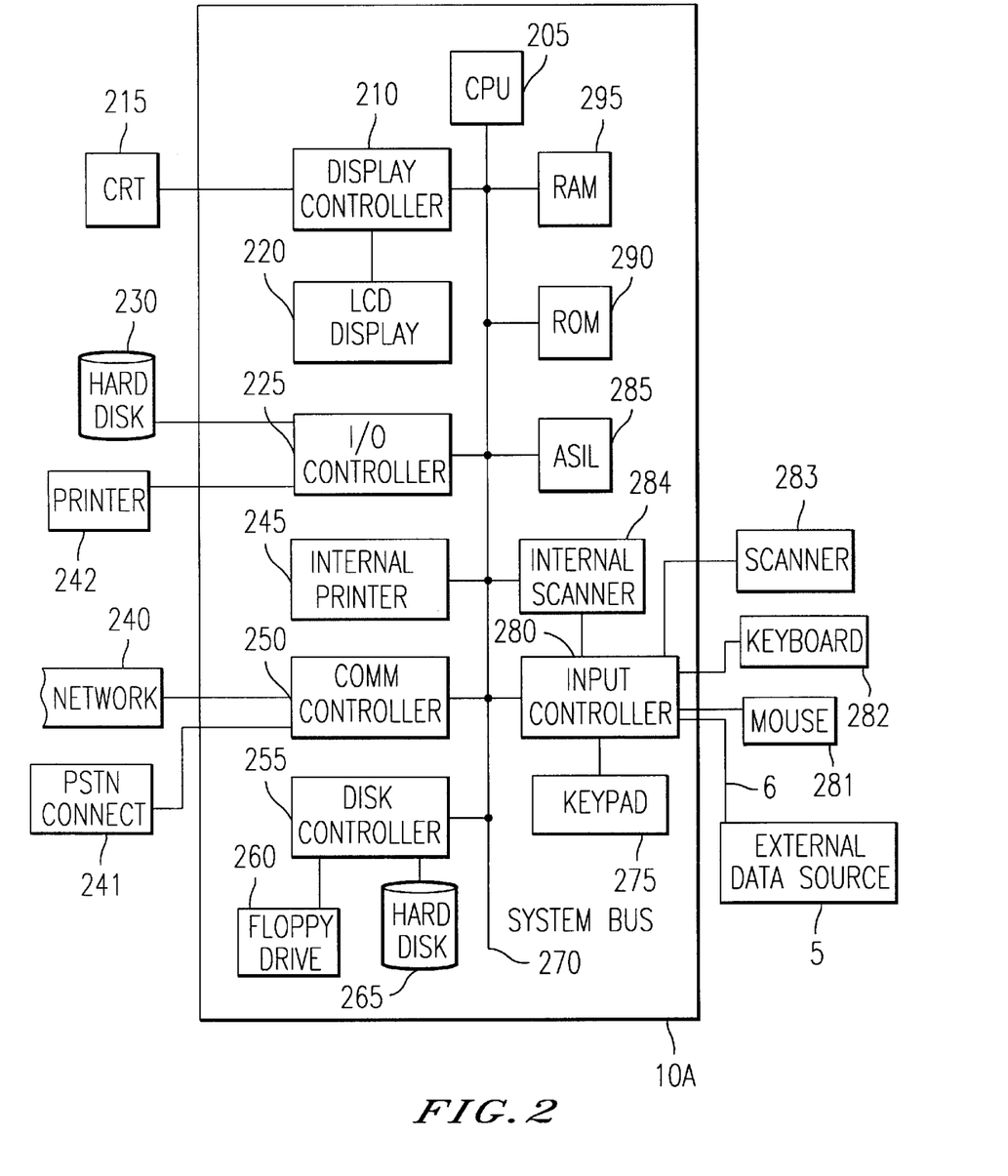
FIG. 2 is a schematic diagram of an electronics portion of a source terminal.

FIG. 2 is a schematic diagram of an electronics portion 10A of the source terminal 10, although the structure of FIG. 2 also suitably describes an example of the destination server 30 and the terminals A–D (50–53). The electronics portion 10A includes a system bus 270 that interconnects a variety of components that populate the system bus 270. A central processing unit (CPU) 205 is one component that populates the bus and provides general purpose control of the source terminal 10, as well as bus administration functions for the system bus 270. The CPU 205 has available to it system random access memory (RAM) 295 for temporary storage use, non-volatile read only memory (ROM) 290 for program and parameter storage, and application specific integrated circuit (ASIC) 285 for performing specialized data manipulation. Alternatively, the ASIC 285 replaced/augmented with other data manipulation devices such as field programmable gate arrays (FPGA, not shown), programmable logic devices (PLDs, not shown) and other processing units (such as digital signal processing chips, not shown). Also available as system resources are a disk controller 255, which controls an internal floppy drive 260 and a hard disk 265, and an input/output (I/O) controller 225, which controls an external hard disk 230 and an external printer 242. Either the external printer 242 or an internal printer 245 may be used to print text and data files output by the source terminal 10.

The electronics portion 10A also includes an input controller 280 that controls an internal scanner 284, an optional external scanner 283, an external keyboard 282, an external mouse 281, and an internal keypad 275. Under control of the input controller 280, either the internal scanner 284 or the external scanner 283 may be used to capture an image of an object document and convert the image into a digital data stream that is passed through the input controller 280 to the system bus 270 for further processing. The input controller 280 also receives input from keypad 275, which serves as a data input device for source terminal 10, although the keyboard 282 and the mouse 281 serve as alternative input devices.

The input controller 280 also provides the interface (at a connector formed thereon) to the external interface 6 which interconnects the external data source 5 to the source terminal 10. For supporting digital signals, the input controller 280 includes interface logic that supports a FireWire interface or another interface standard if another interface is used. When analog signals are provided, the input controller 280 includes an analog-to-digital converter (ADC) and digital to analog converter (DAC) for converting the external signals between the analog and digital domains. Data that is input from the external interface 6 is passed over the system bus 270 and stored in the RAM 295, where the data is later used by the CPU 205 in preparing the NSF frames that form the message sent from the source terminal 10.

A display controller 210 is used to control either, or both, of an external cathode ray tube (CRT) display 215 and an internal liquid crystal display (LCD) 220. Other display formats would also be suitable, including plasma displays, active and passive light emitting diode (LED) displays, etc. The displays 215 and 220, in tandem with the keypad 275, the keyboard 282, and the mouse 281, serve a user interface function.

A communications controller 250 also resides on the system bus 270 and connects to an external network 240 and an external (or internal) PSTN connection 241. The connection to the network 240 corresponds to the type of network to which the source terminal 10 interfaces. The PSTN connection 241 is preferably an RJ-11 connection, although other connections are possible such as Integrated Services Data Network (ISDN) line connections, a broadband ISDN (b-ISDN) line connection, and a wireless access provider connection, for example.

Figure 3:
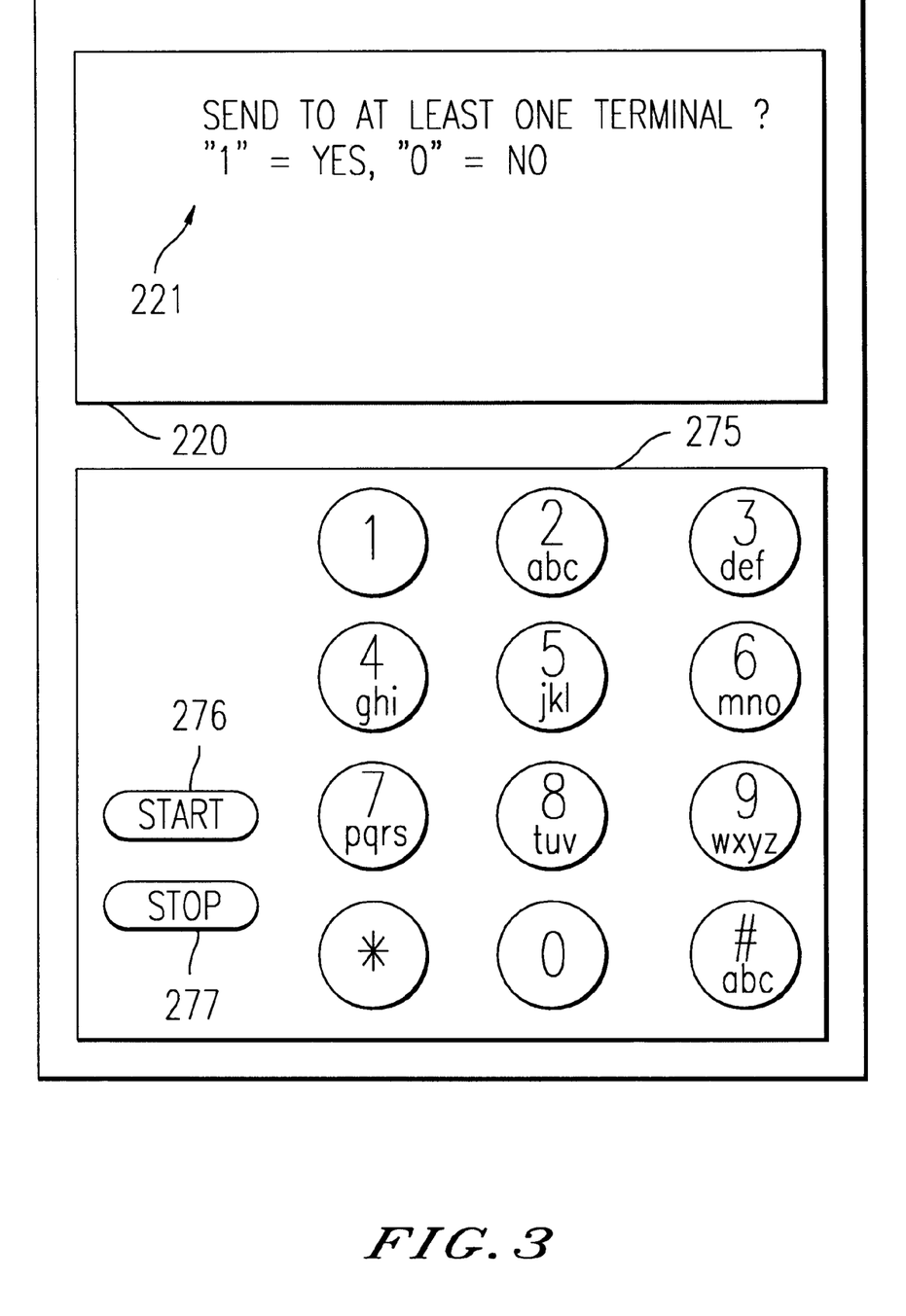
FIG. 3 is a plan view of a display and a keypad of a source terminal.

FIG. 3 illustrates the display 220 and the keypad 275 of source terminal 10. The keypad 275 includes a 12-digit numeric keypad, a "start" key 276 and a "stop" key 277. Data input by a user on the keypad 275 is echoed (i.e., displayed) on the display 220 so that the user knows what the user entered at any given time. In addition, display 220 also includes text, generated by source terminal 10 which "prompts" the user to enter specific information at a specific time. For example, in FIG. 3, the display 220 is prompting the user to enter a "1" if the user wishes to route a message to at least one terminal, and enter a "0" if the user chooses not to route a message to at least one terminal. Other prompting messages are displayed at other times. For example, the input controller 280 and CPU 205 (FIG. 2) cooperate with one another to sense whether an external data source 5 is connected to the input controller 280. If the external data source 5 is connected, the CPU causes the display 220 to prompt the user to indicate whether data that is input from the external data source 5 is to be sent to one or more of the destination terminals.

Figure 4:
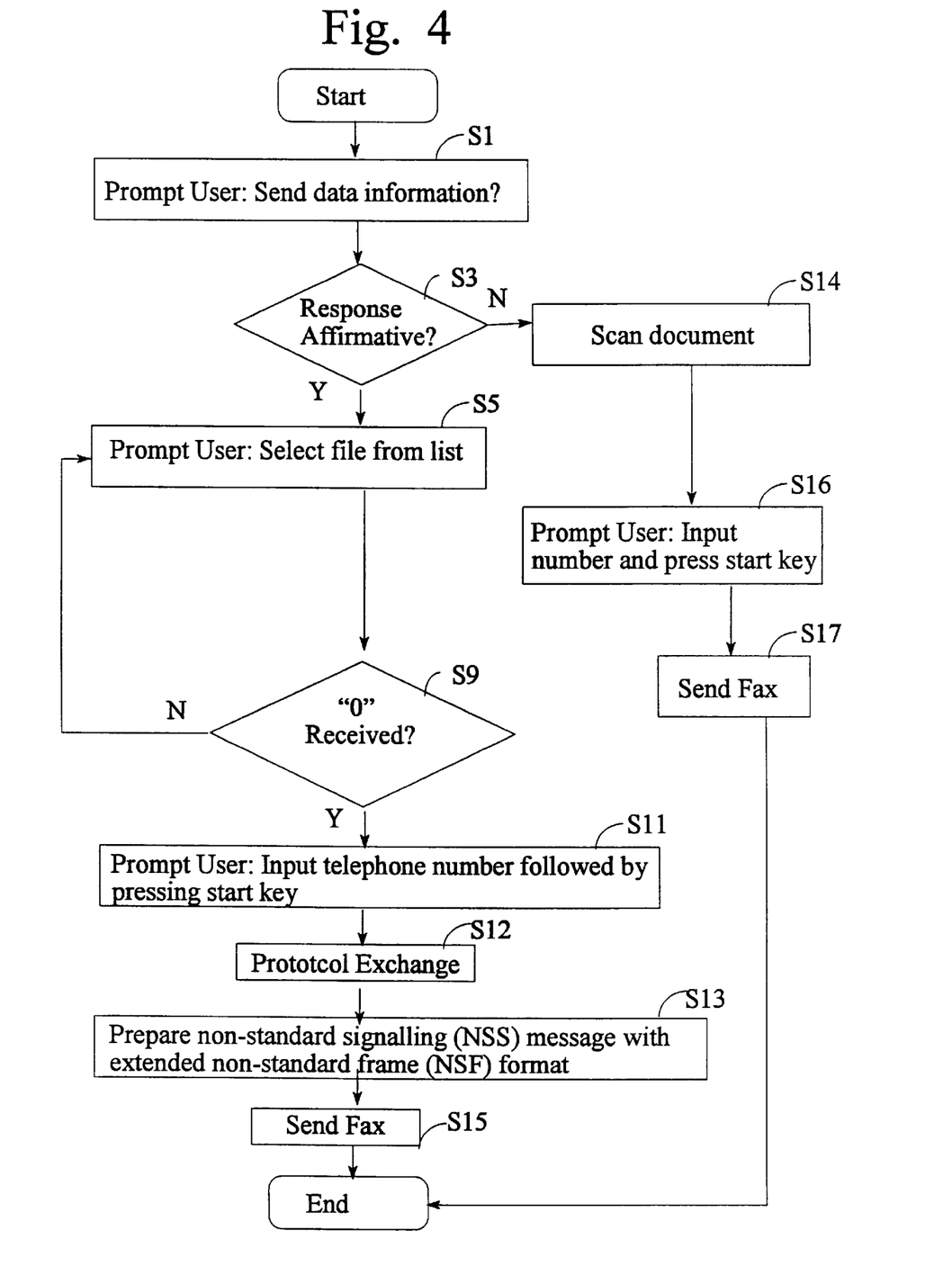
FIG. 4 is a flowchart of a method for forming and sending a message, copies of which are distributed to multiple destination terminals identified in the message, and data included in the message being generated external to the source terminal.

FIG. 4 is a flowchart illustrating a method by which a user inputs information into the keypad 275 (FIG. 3) to form a message that includes data information from the external data source 5 that is to be sent to at least one of the destination terminals 50–53 (FIG. 1). Details of the routing features are discussed in co-pending applications 08/655, 079 and 08/778,779. Alternatively, a greater number of destination addresses may be identified in a message from the source terminal 10 by including the respective addresses in a 20-byte data field, as will be discussed in reference to FIG. 8.

The process, illustrated in FIG. 4, begins in step S1 where the source terminal 10 displays on the display 220 a prompt querying whether the user wishes to send a copy of an information file stored in the source terminal 10 (which may have originated from the external data sources 5) to at least one destination terminal (50–53). The process then proceeds to step S3 where the source terminal 10 queries whether an affirmative response was received. If the response in step S3 was negative, the process proceeds to step S14 where the user scans a document to be faxed, then in Step S16 the user is prompted to input the telephone number of the destination terminal or server followed by a prompt to press the Start key 276. The process then proceeds to step S17 where the facsimile message is sent and the process ends.

If the response to step S3 is affirmative, the process proceeds to step S5 where the user is prompted to select from a list of data files stored in the source terminal 10 which file (or files) the user would like to have sent to the destination terminals 50–53. The prompt instructs the user to press the "*" key to scroll forward in the list, "#" to scroll backward in the list, press "1" to select an entry and press "0" to indicate all selections have been made. Alternatively, the process may also use other characters, keyboard selections, or other user interface techniques for identifying specific files. After each keypad selection, the process flows to step S9 where an inquiry is made regarding whether a "0" was entered. If the response to the inquiry in step S9 is negative, the process returns to step S5 where the user selects another file from the list. However, the process proceeds to step S11 if the response to step S9 is affirmative. In step S11, the source terminal 10 prompts the user to input the telephone number of the destination server 30 (FIG. 1) followed by pressing the start key 276 (FIG. 3). After the user presses the start key 276, the process flows to step S12 where a protocol exchange is made between the source terminal 10 and the destination server 30, where the details of the exchange will be discussed with respect to FIGS. 5 and 6A.

After the protocol exchange has been initialized, the process flows to step S13 where the source terminal 10 prepares a non-standard signaling (NSS) facsimile message that uses extended NSF frames to host the data information to be transmitted to the destination terminal 50 via the destination server 30. The term "extended" means that multiple NSF frames may be sent as will be discussed with respect to FIG. 8. Subsequently, in step S15, the source terminal 10 sends the data information in the NSF frames and the process ends once all of the frames in the message have been sent.

According to this method, the user is prompted in incremental steps to enter the routing data and identify which data files are to be sent to the identified destination terminals 50–53 via the destination server 30. Alternatively, the source terminal 10 may send the message directly to one of the destination terminals 50–53. The data information is input to the source terminal 10 from the external data source 5 or the data may be derived from an image that has been scanned into the source terminal 10. Thus, the user may use the source terminal 10 as a general purpose communications device capable of communicating non-facsimile data or facsimile data to one or more destination terminals 50–53 via the destination server 30 and using facsimile message signaling.

Figure 5:
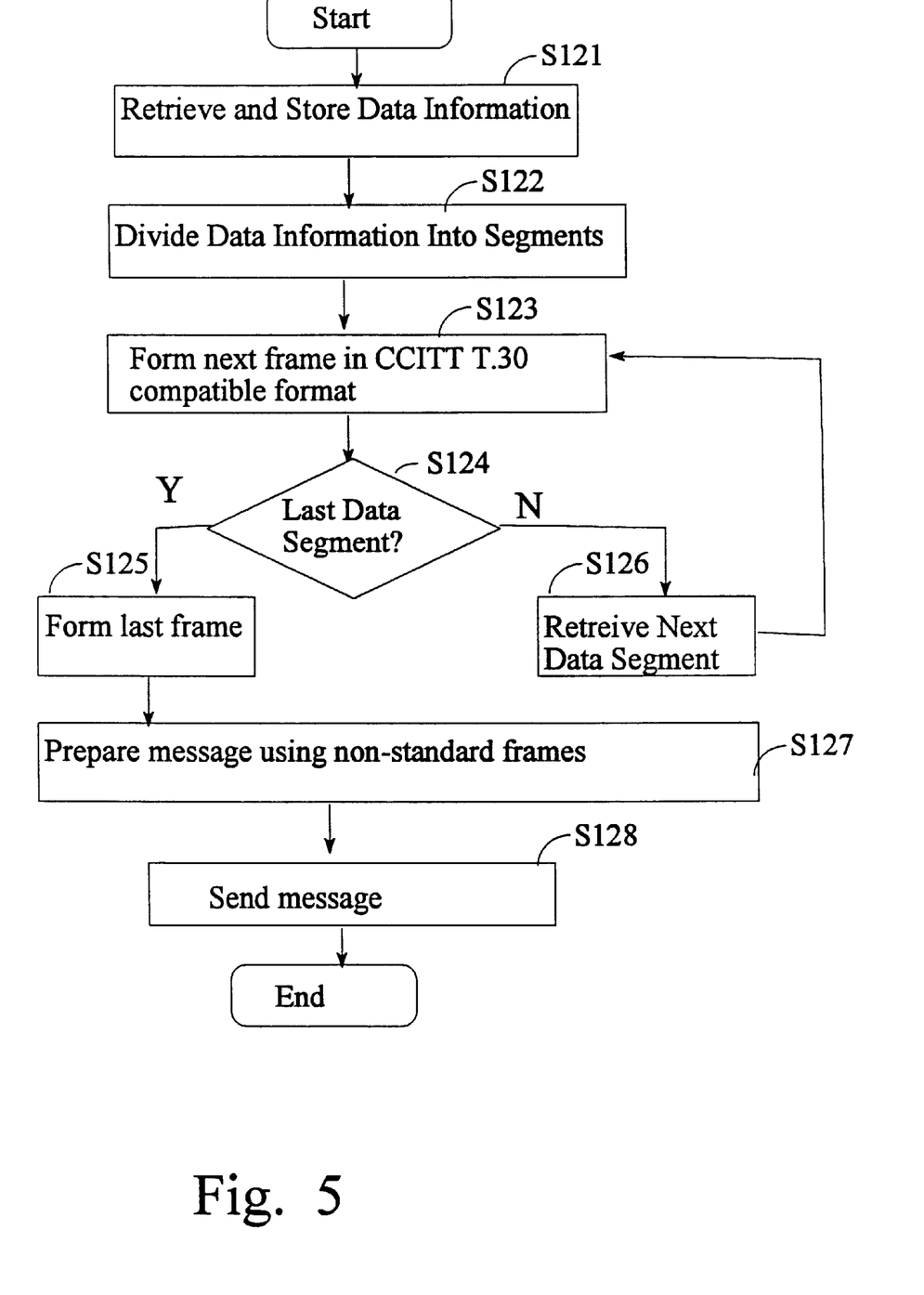
FIG. 5 is a flowchart showing the steps for forming the message.

FIG. 5 is a flowchart showing the detailed steps for forming the digital message. The process begins in step S121 where the data information is retrieved from the external data source 5 and stored in the RAM 295. Once the data is stored, the process proceeds to step S122 where the CPU 205 divides the data information into 20 byte segments (either on a frame-by-frame basis or at one time). The process then proceeds to Step S123 where the CPU 205 forms respective non-standard CCITT T.30 frames, each frame containing a 20 byte segment of the data information. Subsequently, the process proceeds to Step S124 where the CPU 205 decides whether all of the data information has been sent. If the response to the inquiry in step S124 is negative, the process proceeds to step S126 where the CPU inputs in a control field (as discussed with respect to FIG. 8) of the present frame an indication that the present frame is not the last frame, and then retrieves the next data segment. Then the process returns to step S123. If the response to the inquiry in step S124 is affirmative, the process flows to step S125 where the CPU inputs into the control field an indication that the present frame is the last frame. Subsequently, the process proceeds to step S127 where the CPU 205 prepares the entire message, which includes all of the non-standard frames, and then sends the message in a facsimile format to the destination server in step S128. The process then ends.

Figure 6:
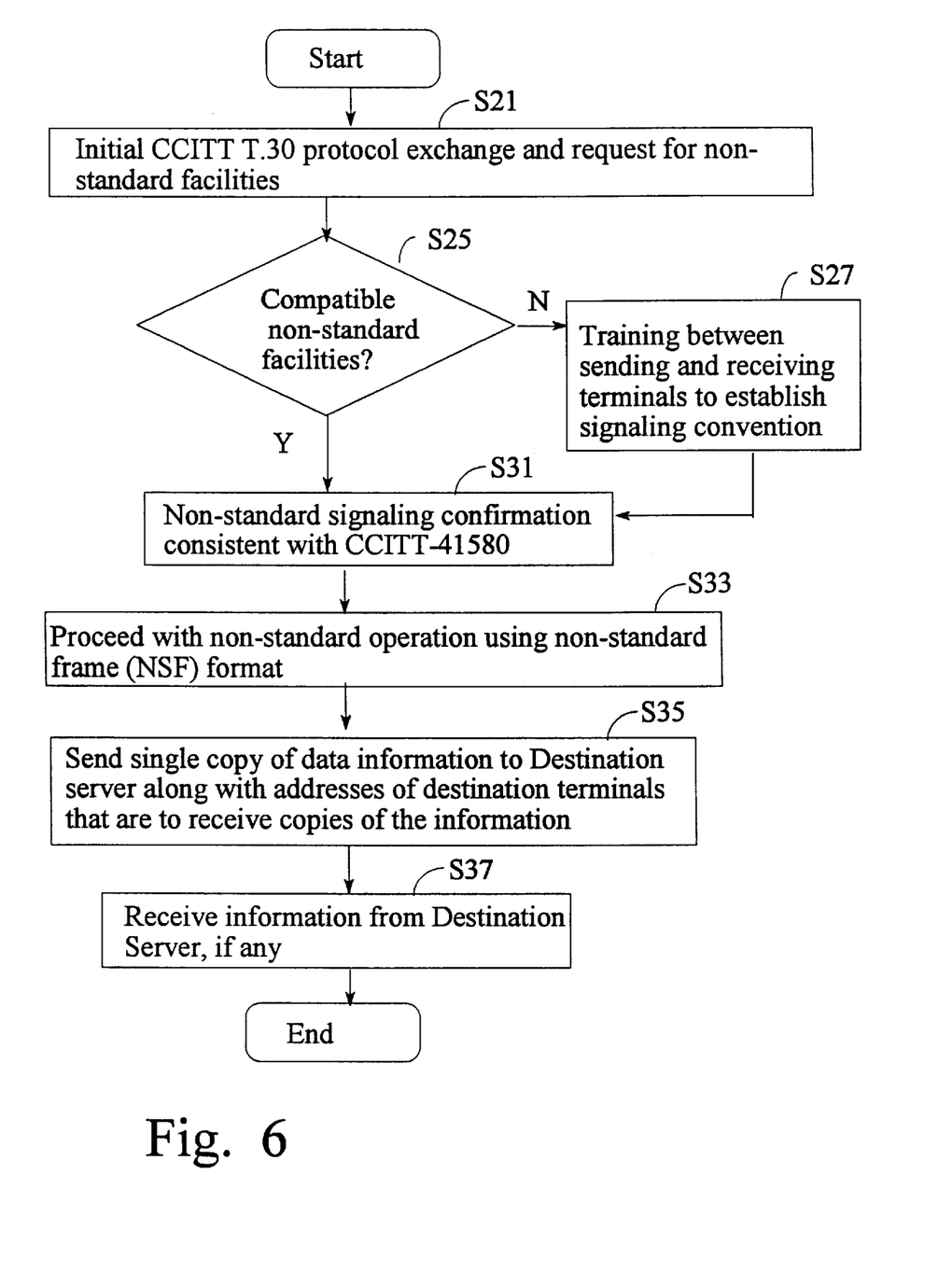
FIG. 6 is a flowchart of a process for establishing communications using a non-standard frame between a source terminal and a destination terminal.

FIG. 6 is a flowchart of a process for establishing communications using a non-standard facility between a source terminal 10 and a destination server 30. The process begins in step S21 where an initial CCITT T.30 protocol exchange is made between the source terminal 10 and the destination server 30 (or if no destination server 30 is used, then a destination terminal 50). Also part of step S21 is a request for nonstandard facilities so that both the source terminal 10 and the destination server 30 recognize that nonstandard facility communications are to be made between the two communicating terminals (terminal 10 and server 30). After step S21, the process proceeds to step S25 where an inquiry is made regarding whether the source terminal 10 and the destination server 30 are compatible non-standard facilities. If the inquiry to step S25 is negative, the process proceeds to step S27 where a training process is established between a source terminal 10 and the destination server 30, where the two devices establish a signaling convention. Subsequent to step S27, the process flows to step S31. Similarly, if the response to the inquiry in step S25 is affirmative, the process flows to step S31 as well. In step S31, non-standard signaling confirmation is made consistent with CCITT-41580 standard which enables non-standard signaling to be made between the two communicating devices. After step S31, the process flows to step S33 where a non-standard operation using non-standard frames are used for signaling. The specific structure of the non-standard frames will be discussed with respect to FIG. 8. After the non-standard operation has been established, the process flows to S35 where a copy of the data information to be sent from the source terminal is included in 20 byte fields (although variable length fields may be used as well) within respective NSF frames and sent to the destination server 30. Along with the NSF frames, the destination server 30 is made aware of the addresses of the destination terminals 50 that are to receive copies of the data information. After all the data information has been sent to the destination server 30, the process proceeds to step S37, where information to be transferred from the destination server 30 is sent to the source terminal 10 and received thereby. Then, the process ends.

Figure 7:
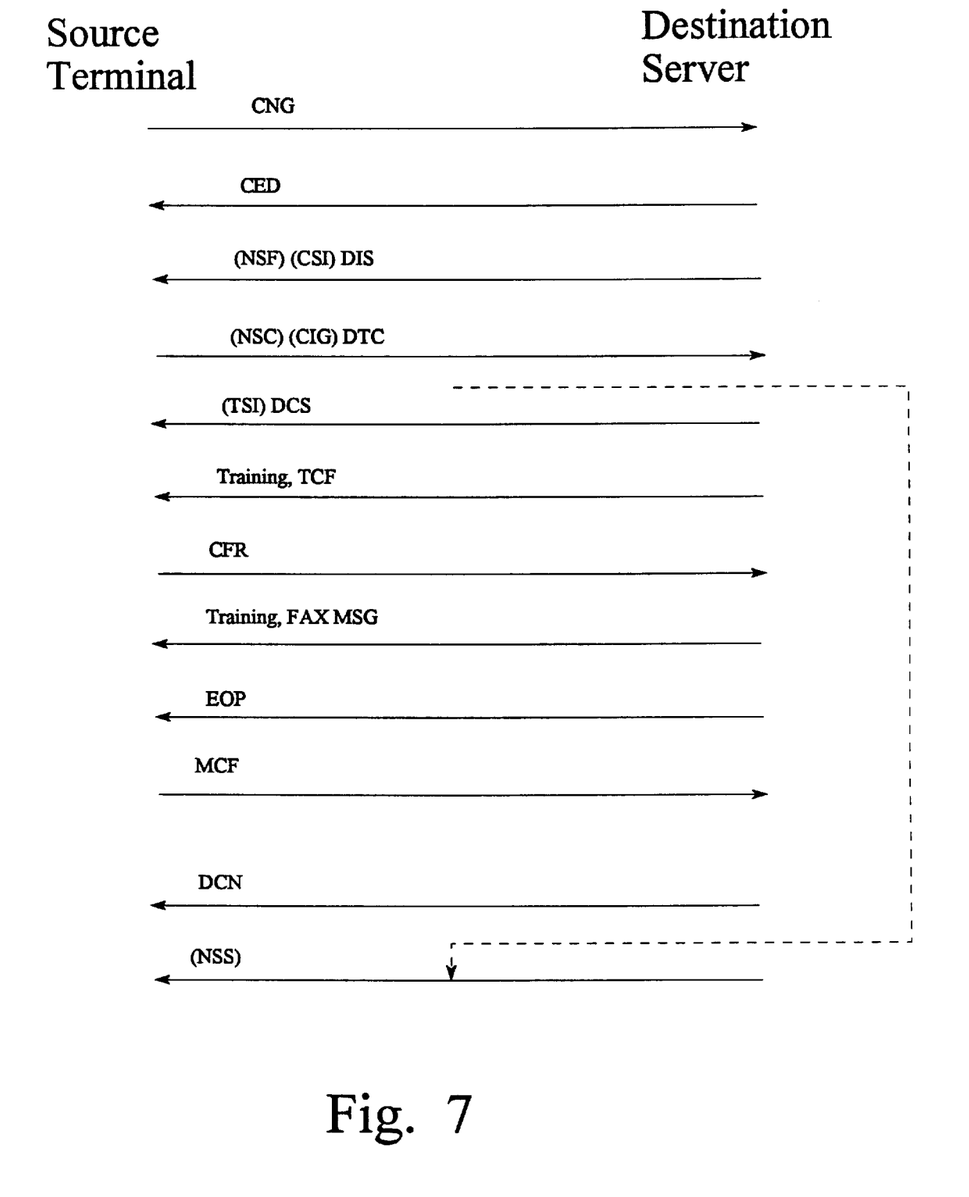
FIG. 7 is a signal protocol chart illustrating a CCITT T.30 signaling protocol.

FIG. 7 illustrates a calling sequence protocol between the source terminal 10 and the destination server 30 which has been adapted from a calling sequence protocol as set forth in CCITT FASSM VII.3 recommendation T.30 regarding polling of nonstandard facilities. A calling sequence is established by the source terminal 10 by transmitting to the destination server 30 a calling tone (CNG) which is a 1.1 kHz tone that remains on for half of a second, then turns off for three seconds. An arrowhead on the CNG calling tone line signifies a direction of signaling. A response to the calling tone (CNG) is a calling station identification (CED) sent from the destination server 30 which is a 2.1 kHz tone with which a facsimile machine answers a call. After sending the called station identification (CED), the destination server 30 sends a called subscriber identification (CSI, or TSI) containing a number which is usually a telephone number of the remote terminal used to communication with the source terminal 10.

Also included with the called subscriber identification is a digital identification signal (DIS) which is identified by the source terminal 10 as a non-standard facility. In response, the source terminal sends a reply message as a non-standard facilities command (NSC) which includes a calling subscriber identification (CIG) which is a frame that gives the caller's telephone number in a digital transmit command (DTC). If the destination server 30 determines that the source terminal 10 and destination server 30 are compatible non-standard facilities, then the calling sequence follows the dashed line in FIG. 7 to a non-standard facility set up command (NSS) to establish directly a non-standard communication link between the source terminal 10 and the destination server 30. In this case, the data information sent from the source terminal 10 is included in one or more NSFs and received by the destination server 30. Details of how the data information is included in the NSF frame are discussed with respect to FIG. 8.

However, if the destination server 30 determines that the two devices are not compatible non-standard facilities, the signaling protocol transitions to the command "(TSI)DCS" which is a transmitting subscriber information message and is a frame sent to the caller with a digital command signal (DCS). The digital command signal is a signal sent when the caller is transmitting, which tells the answerer how to receive the fax. Included in the digital command signal is a modem, speed, image width, imaging encoding, and page length which are included in this digital command signal. Subsequently, the destination server 30 sends to the source terminal a training check frame (TCF) which is a last step in a series of signaling call to training sequence which is designed to let the receiver adjust to the line conditions. In response, the source terminal sends a confirmation receive frame (CFR) which indicates to the destination server 30 that the source terminal 10 is ready to receive a frame. Consequently, the destination server 30 then sends a fax message according to the earlier agreed training conditions where the data information is included in one or more NSFs (details of which will be described with respect to FIG. 8). A last message sent from the destination server is an end of procedure frame (EOP) which is a frame that indicates that the destination server wishes to end the training procedure. In response, the source terminal sends a message confirmation frame (MCF) which confirms that the receiver is ready to receive the next page. However, if all the information has been sent from the destination server 30, the destination server 30 sends a disconnect frame (DCN) which indicates the call is completed.

Figure 8:
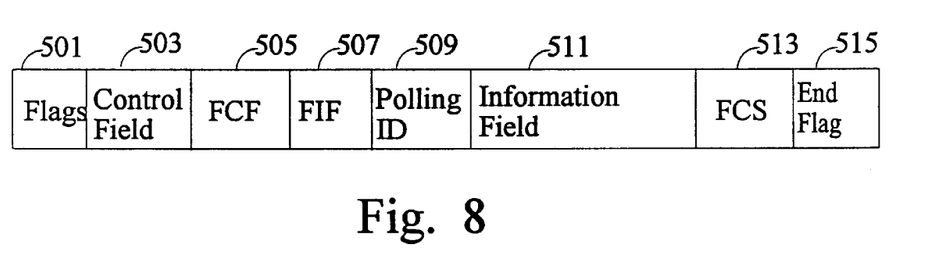
FIG. 8 is a data structure of the non-standard frame used by the present inventive apparatus and method for communicating any type of data information between a source terminal and a destination terminal.

FIG. 8 illustrates a non-standard frame (NSF) format that is used in the present embodiment for passing data information from the source terminal 10 to the destination server 30, and vice versa, if applicable. One or more NSF frames used to host the data information are composed by the CPU 205 (FIG. 2) and stored in the RAM 295 (FIG. 2) prior to being sent to the destination server 30. In the data structure shown in FIG. 8, a flags field 501 includes a start flag having five two-byte fields, each of which include hexadecimal values 7Eh, signifying the start of a frame. Similarly, an end flag field 515 is included at the end of the frame to signify an end of the frame. Next to the flag field 501 is a two-byte control field 503 which is used to indicate whether the current frame is a last frame. In particular a value of 2Fh is inserted by the CPU 205 if the present frame is a last frame and the value 0Fh is inserted if the present frame is not the last frame. As will be discussed, the 0Fh value will typically be included only after the entire data information has been sent from the source terminal 10 to the destination server 30.

A facsimile control field (FCF) 505 is a two-byte field used to signify message type. Example message types include a calling message, a NSF (code 02), NSF setup message (code 03), end of message, etc. A facsimile information field (FIF) 507 is a two-byte field used to define specific details of the type of facsimile message to be sent (e.g., code 08 signifying modified Huffman code, A4 size paper, etc.). A polling identification field 509 is a two-byte field (although a variable length field is an alternative) in which identification of one or more addresses of devices to be polled is included. Alternatively, consistent with the routing feature of the present invention, the polling field may be used to hold additional addresses of devices which are to receive a copy of a facsimile message sent by the source terminal 10.

An information field 511 is 20 bytes in length (alternatively a variable length field may be used) and is used by the CPU 205 (FIG. 2) to store portions of the data information to be sent from the source terminal 10 to the destination server 30. If a single one of the information fields 511 is not long enough to convey all the data information (e.g., a data file from the external data source 5), then the CPU 205 includes in the present frame the code 0Fh in the control field 503, indicating that the present frame is not the last frame. In this case, the CPU 205 prepares additional NSF frames until all of the data information has been sent, where the last NSF frame includes the code 2Fh in the control field 503. Alternatively, the second, third . . . to the last NSF frame sent may also include portions of the data information in the FCF field 505, FIF field 507, and polling ID field 509 so as to increase the data throughput on a frame-by-frame basis. A cyclical redundancy check (FCS) field 513 is preferably not replaced with data information because the function served by the FCS field 513 is to preserve the integrity of the data information contained in the NSF.

Thus, by adapting the function performed by the source terminal 10 and the destination server 30, NSF frames are used in an atypical way to establish a digital data communications link between a source facsimile device and one or more destination facsimile devices. By establishing this digital communications link, the source terminal 10 serves as a general purpose communications resource for conveying any type of information that is input to the source terminal 10 to one or more destination terminals. One example use of the inventive system and method is to send an image from a digital camera (serving as the external data source 5 of FIG. 1) to one or more terminals 50–53 via the source terminal 10 and the destination server 30. This approach requires substantially less hardware and expense than other devices such as a personal computer for performing this function, and provides a user-friendly interface for office workers who are familiar with how to operate facsimile machines. Consequently, the present method and apparatus adapts conventional facsimile hardware, software, and messaging protocol to provide a low cost, convenient communications resource for conveying any type of information from a source terminal 10 to one or more destination terminals 50–53.

Figure 9:
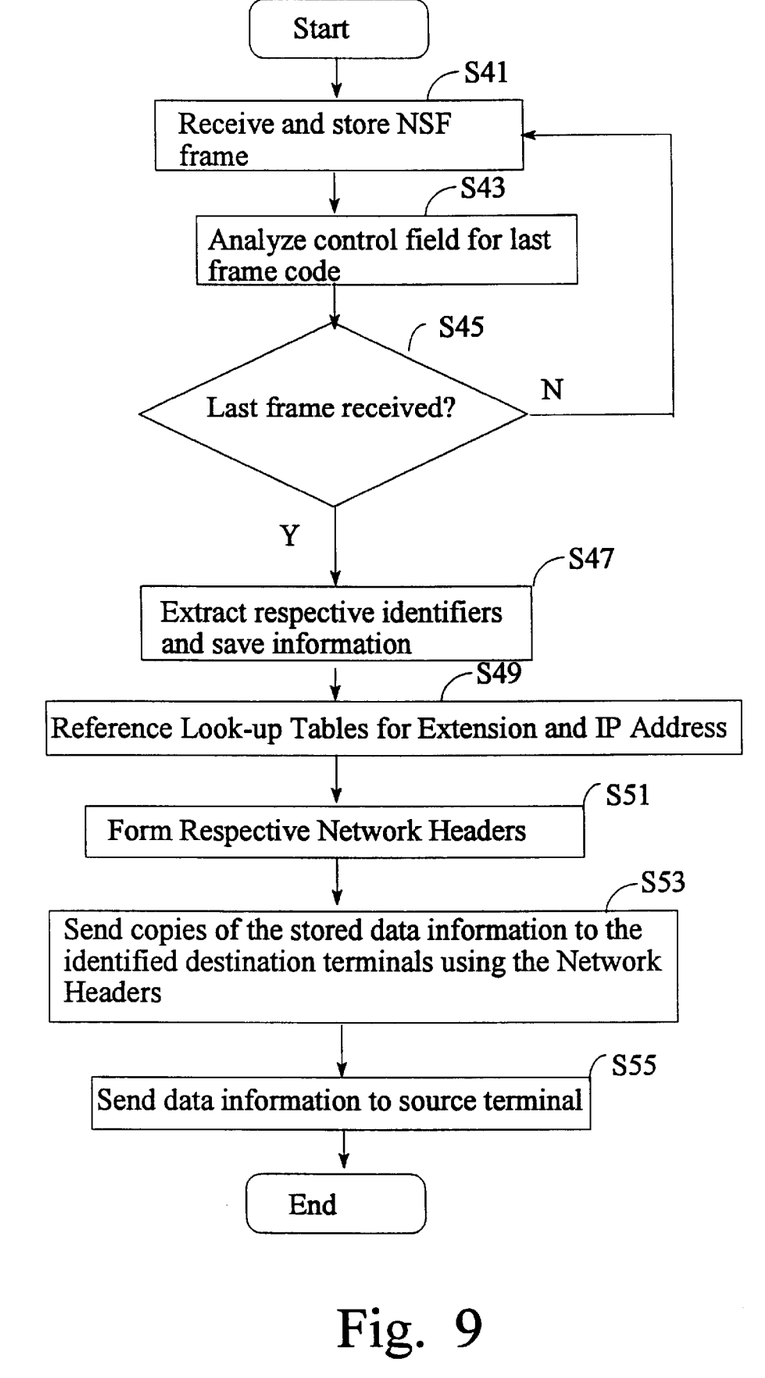
FIG. 9 is a flowchart of a process performed by a destination server for interpreting the non-standard frames and extracting the data therein so the data may be stored or sent to a destination terminal.

FIG. 9 is a flowchart describing a reception/routing process performed by the destination server 30 (although if a direct connection is made, a similar, albeit simplified, process would be performed by one of the destination terminals 50–53). The process begins in step S41 where the destination server 30 receives and stores an NSF frame. The process then proceeds to step S43 where the received NSF frame has its control field 503 analyzed to determine if the present NSF frame is in fact a last NSF frame. Subsequently, the process proceeds to step S45 where an inquiry is made regarding whether the control field 503 indicates that the last frame has been received. If the response to the inquiry in step S45 is negative, the data contained in the information field 511 is stored in a RAM and the process returns to step S41 where other NSF frames are received. However, if the inquiry in step S45 indicates that the last frame has been received, the data in the information field 511 (FIG. 8) is saved with other information from previous NSF frames, if any. Also, the TSI field (which was included as part of an initial handshake procedure) is scanned so as to extract identifiers for respective destination terminals 50–53 to which the saved data information is to be routed. After step S47, the process flows to step S49 where the destination server 30 compares the respective identifiers identified in step S47 with IP addresses and/or extensions of terminals 50–53 that are saved in a lookup table saved in semiconductor memory (or other memory) in the destination server 30. After the appropriate extension and/or IP addresses for the respective destination terminals 50–53 are identified in step S49, the process flows to step S51, where the destination server 30 forms respective network headers for routing copies of the data information to the respective destination terminals 50–53. Subsequently, the process proceeds to step S53, where copies of the stored data information are routed to the identified destination terminals using the network headers formed in step S51. Subsequently, the process flows to step S55, where if information is to be sent to the source terminal 10 is present, this information is then sent and then the process ends.

A second embodiment of the present invention is the same as that of the first embodiment although the analog lines 21 and 22 are replaced with a wireless communication channel(s) preferably a narrow band Advanced Mobile Phone System (N-AMPS) cellular channel of the type used in North America cellular telephone communication systems. However, other wireless communications channels would be suitable including Global System for Mobile Communications (GSM), Personal Communication Services (PCS), cordless telephone channels, digital cellular channels, and the like. In this embodiment, destination server 30 and/or other source terminals 10 are equipped with wireless modems, which replace the analog lines 22 and 21 of FIG. 1. Also, the PSTN connection 241 of FIG. 2 is a wireless modem connection in this embodiment.

Figure 10:
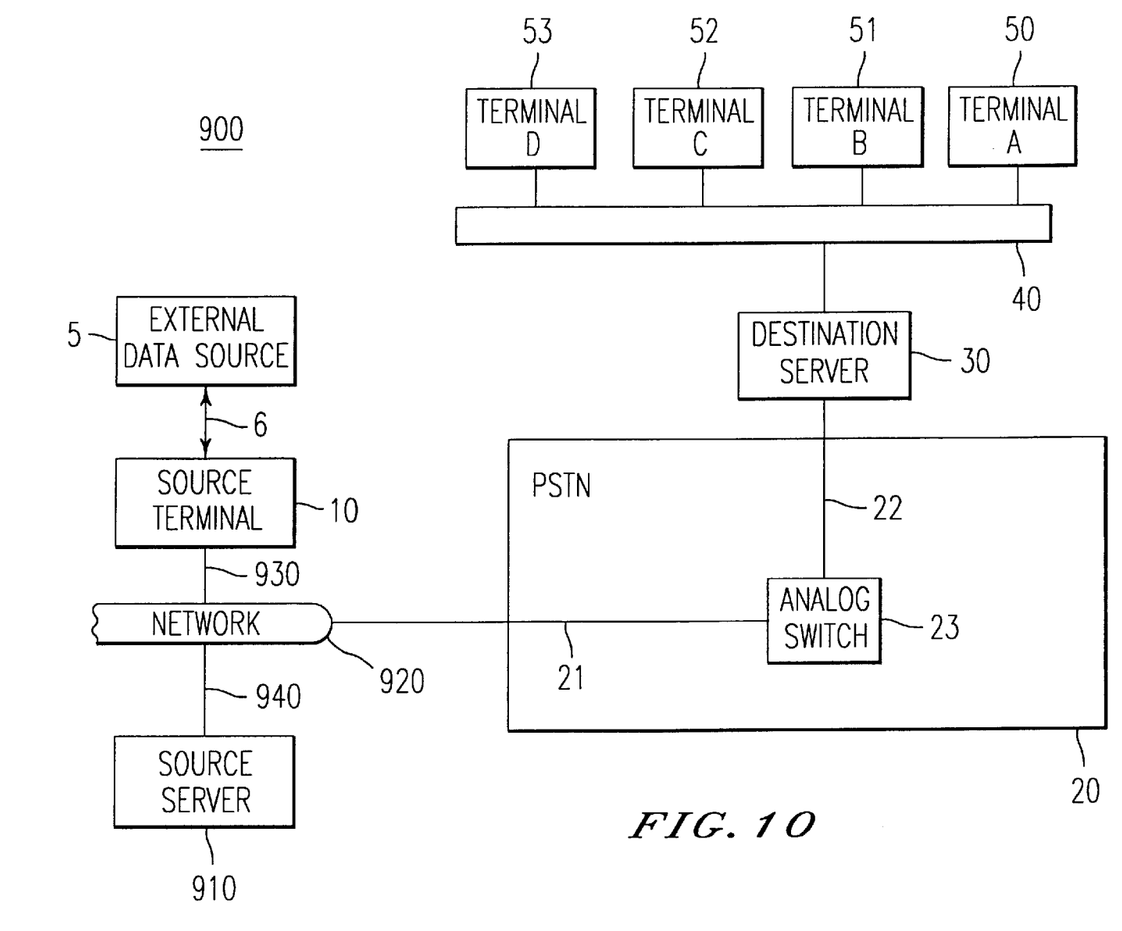
FIG. 10 is a schematic diagram of a third embodiment of the present invention showing a communication system with a network routing architecture.
Figure 11:
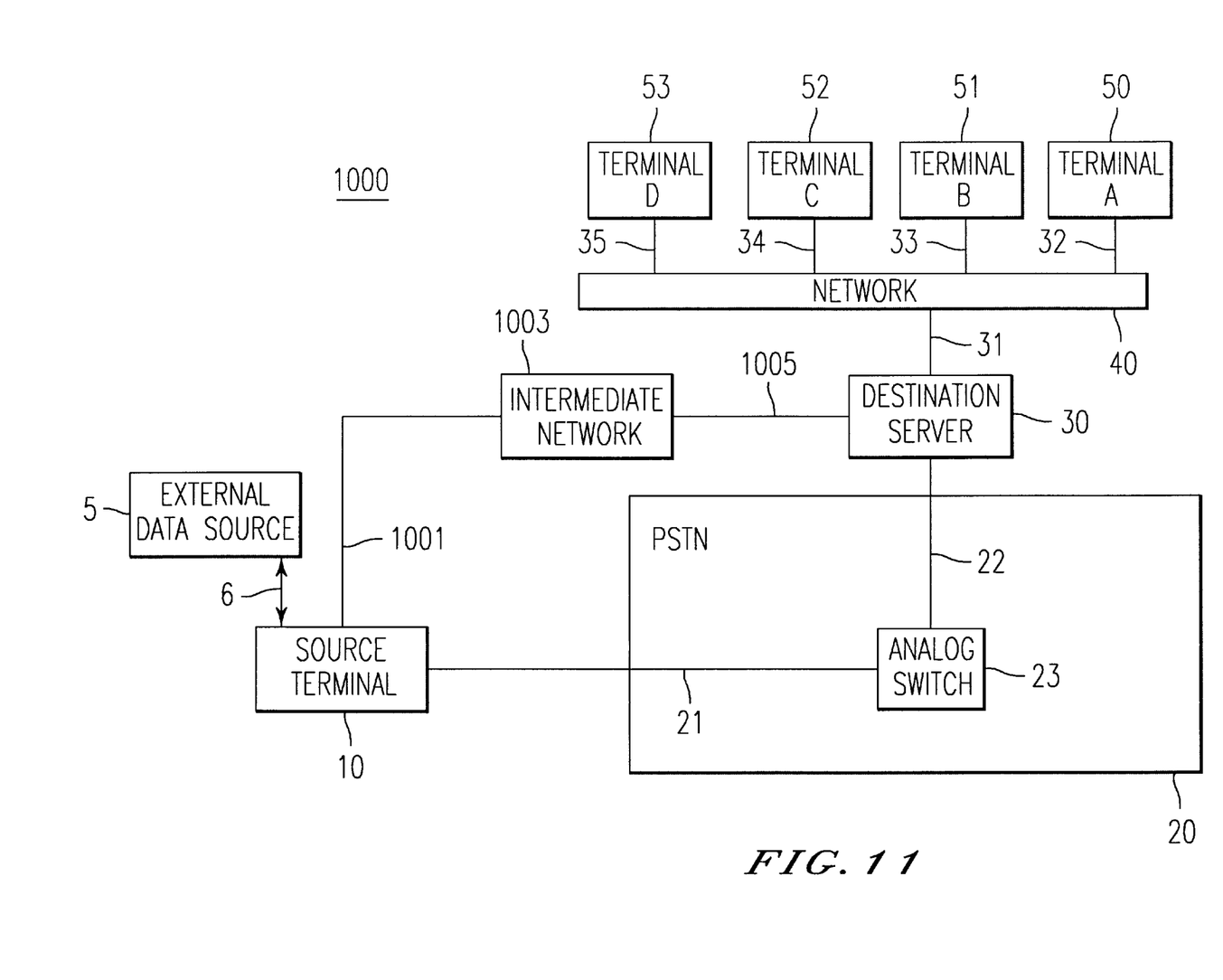
FIG. 11 is a schematic diagram of a fourth embodiment of the present invention showing a communication system with multiple communication links between a source terminal and a destination server.

A third embodiment of the present invention is described with reference to a communication system 900 shown in FIG. 10, where the source terminal 10 is connected to a network 920. More particularly, the source terminal 10 is connected to the network 920 through a node 930, and a node 940 connects a source server 500 to the network 920. The source server 500 is connected to an analog line of a PSTN network 23, as described in FIG. 1, or to a wireless channel as described in the second embodiment. A telephone number and respective identifiers for the intended destination terminals (50–53) are input to the source terminal 10 and are used to form routing and polling request messages. Similar to the first embodiment, the external data source 5 is connected to the source terminal 10 via the external interface 6 so that data information from the external data source 5 may be routed to one or more of the terminals 50–53 via the source terminal 10, network 920, PSTN 20, destination server 30, and network 40. Also, a destination server's telephone number, TSI field, and facsimile data generated by the source terminal 10 are routed through the node 930 and the network 920 to the source server 910, where the source server 910 then converts the source network message into a format suitable for transmission over the PSTN 20 (or a wireless channel, or data communication network, or the like). The source server 910 preferably includes a modem pool that includes a plurality of modems.

As is clear from the symmetrical architecture of the communication system 900, the destination terminal 50 may also poll one or more terminals (e.g., the source terminal 10) of the network 920.

A fourth embodiment of the present invention is described with reference to a communication system 1000 shown in FIG. 9, where the source terminal 10 connects both to the PSTN 20, as well as an intermediate network 1003, through the network line 1001. More particularly, the source terminal 10 is configured to communicate with the destination server 30 either using the connection of the PSTN 20 or through the intermediate network 1003, (such as for example Internet resources) which are connectable through the network line 1001 (e.g., ISDN, microwave link, proprietary line, etc.). Furthermore, the intermediate network 1003 connects to the destination server 30 through another communication line 1005. Other attributes of the communication system 1000 are the same as that shown in communication system 100 of FIG. 1 (as well as the communication system 900 of FIG. 10). By providing an alternative communication channel (links 1001, 1005, and intermediate network 1003), the source terminal 10 and the destination server 30 can communicate with one another so as to exchange data information from the source terminal 10 to the source terminal 30 (and vice versa) through the PSTN 20. Similar to the other embodiments, the external data source 5 is connected to the source terminal 10 via the external interface 6 so that data information from the external data source 5 may be routed to one or more of the terminals 50–53 via the source terminal 10, network 920 PSTN 20, destination server 30, and network 40.

A fifth embodiment of the present invention includes a method and apparatus that forms a facsimile message having identifiers included therein for routing copies of a message (e.g., a data file of a digital image taken by a digital camera) to one or more destination terminals that are connected locally to a destination server 30 or connected remotely (e.g., via Internet access) to other addressable terminals.

A sixth embodiment of the present invention provides a list of candidate destination terminals from the destination server to the source terminal 10 so a user at the source terminal 10 may select particular destination terminals from the list. Similarly, alternative embodiments to those expressly disclosed herein include features disclosed in co-pending applications 08/655,079 and 08/778,779.

The processes set forth in the present description may be implemented using a conventional general purpose microprocessor programmed according to the teachings of the present specification, as will be appreciated to those skilled in the relevant art(s). Appropriate software coding can readily be prepared by skilled programmers based on the teachings of the present disclosure, as will also be apparent to those skilled in the relevant art(s).

The present invention thus also includes a computer-based product which may be hosted on a storage medium and include instructions which can be used to program a computer to perform a process in accordance with the present invention. The storage medium can include, but is not limited to, any type of disk including floppy disk, optical disk, CD-ROMS, and magneto-optical disks, ROMS, RAMs, EPROMs, EEPROMs, flash memory, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A method for forming a digital message to be routed to at least one destination terminal comprising the steps of:
   receiving from an external source data information that is to be included in said digital message;
   storing at a source terminal the data information that is to be routed to the at least one destination terminal in said digital message;
   dividing said data information into segments;
   forming a first facsimile compatible non-standard frame comprising,
      forming a first subframe that includes at least one of said segments, and
      forming a second subframe that includes an extension indication value indicative of whether said first facsimile compatible non-standard frame is a last frame of said message; and
   forming a second facsimile compatible non-standard frame if said extension indication value included in said second subframe indicates said first frame is not said last frame, said second facsimile compatible non-standard frame having a second subframe that includes another one of said segments.

2. The method of claim 1, wherein said step of receiving comprises receiving said data information from at least one of a FireWire connector, a RJ-11 connector, a fiber optic connector, an integrated services digital network connector, a coaxial cable connector, and a universal serial bus connector.

3. The method of claim 1, wherein said receiving step comprises receiving said data information from at least one of a digital versatile disc apparatus, a video camera, a photocopier, a computer, and a compact disc player.

4. The method of claim 1, further comprising the step of including at least two identifiers of respective destination terminals in said message so that said message may be routed to said respective destination terminals at a destination server apparatus.

5. The method of claim 1, wherein:
   said step of forming a first facsimile compatible non-standard frame comprises forming a first CCITT T.30 non-standard frame; and
   said step of forming a second facsimile compatible non-standard frame comprises forming a second CCITT T.30 non-standard frame.

6. An apparatus configured to form a digital message to be routed to at least one destination terminal comprising:
   means for receiving from an external source data information that is to be included in said digital message;
   means for storing the data information that is to be routed to the at least one destination terminal;
   means for dividing said data information into segments;
   means for forming a first facsimile compatible non-standard frame comprising,
      means for forming a first subframe that includes at least one of said segments, and
      means for forming a second subframe that includes an extension indication value indicative of whether said frame is a last frame of said message; and
   means for forming a second facsimile compatible non-standard frame if said extension indication value included in said second subframe indicates said first frame is not said last frame, said second facsimile compatible non-standard frame having a second subframe that includes another one of said segments.

7. The apparatus of claim 6, wherein said means for receiving comprises at least one of a FireWire connector, a RJ-11 connector, a fiber optic connector, an integrated services digital network connector, a coaxial cable connector, and a universal serial bus connector.

8. The apparatus of claim 6, wherein said means for receiving is for receiving said data information from at least one of a digital versatile disc apparatus, a video camera, a photocopier, a computer, and a compact disc player.

9. The apparatus of claim 6, further comprising means for including at least two identifiers of respective destination terminals in said message so that said message may be routed to said respective destination terminals at a destination server apparatus.

10. The apparatus of claim 6, wherein:
   said means for forming a first facsimile compatible non-standard frame comprises means for forming a first CCITT T.30 non-standard frame; and
   said means for forming a second facsimile compatible non-standard frame comprises means for forming a second CCITT T.30 non-standard frame.

11. An apparatus configured to form a digital message to be routed to at least one destination terminal comprising:
   a connector configured to receive said data information from an external data source, said connector comprising at least one of a FireWire connector, a RJ-11 connector, a fiber optic connector, an integrated services digital network connector, a coaxial cable connector, and a universal serial bus connector;
   a bus configured to transport digital signals;
   a memory that stores data information to be routed to the at least one destination terminal, said memory being coupled to said bus;
   a processor being coupled to said bus, said processor comprising,
      a retrieval mechanism configured to retrieve at least one segment of said data information from said memory via said bus,
      a first frame formatting mechanism configured to form a first facsimile compatible non-standard frame comprising a first subframe that includes at least one of said segments and a second subframe that includes an extension indication value indicative of whether said frame is a last frame of said message, and
      a second frame formatting mechanism configured to form a second facsimile compatible non-standard frame if said extension indication value included in said second subframe indicates said first frame is not said last frame, said second facsimile compatible non-standard frame having a second subframe that includes another one of said segments.

12. The apparatus of claim 11, further comprising an input controller configured to receive said data information from at least one of a digital versatile disc apparatus, a video camera, a photocopier, a computer and a compact disc player.

13. The apparatus of claim 11, wherein said processor further comprises an identification formatting mechanism configured to include at least two identifiers of respective destination terminals in said message so that said message may be routed to said respective destination terminals at a destination server apparatus.

14. The apparatus of claim 13, further comprising:

a receiver configured to receive said digital message and extract said data information and said at least two identifiers therefrom; and a routing mechanism configured to route copies of said data information to respective of said destination terminals corresponding to said at least two identifiers.

* * * * *